3,729,515
DIMERIZATION
Neville Leverne Cull, Baker, Elroy Merle Gladrow, Baton Rouge, Ralph Burgess Mason, Denham Springs, and Glen Porter Hamner, Baton Rouge, La., assignors to Esso Research and Engineering Company
No Drawing. Filed Jan. 10, 1967, Ser. No. 608,265
Int. Cl. C07c 47/26
U.S. Cl. 260—602                                              14 Claims

ABSTRACT OF THE DISCLOSURE

The present disclosure concerns the use of Zn-exchanged, Mg-exchanged, Zn and Co-exchanged, Mg and Co-exchanged and Mg, Zn and Co-exchanged crystalline zeolite molecular sieves with effective pore openings of 4 to 15 Angstrom units ("Zeolite A," "Zeolite X" and "Zeolite Y" exchanged sieves) to dimerize $C_2$ to $C_{20}$ saturated, aliphatic aldehydes and $C_3$ to $C_{20}$ saturated, aliphatic ketones. These materials are known compounds which, upon hydrogenation to yield 1,3-glycols, are useful as insect repellents and synthetic lubricants intermediates, plasticizers, etc.

---

The present invention is directed to an improved process for preparing $C_{2n}$ dimer aldehydes and ketones from $C_n$ aldehydes and ketones, respectively, by contacting a $C_n$ material selected from the group consisting of saturated aliphatic aldehydes wherein $n$ is an integer of from 2 to 20 and saturated aliphatic ketones wherein $n$ is an integer of from 3 to 20 at aldolization temperatures, with an inorganic, crystalline porous metal alumino silicate molecular sieve catallyst composed principally of materials of the molar formula:

$$MO \cdot Al_2O_3 \cdot xSiO_2$$

wherein M is a metal selected from the group consisting of zinc and magnesium and $x$ ranges from 2 to 10, said crystalline porous metal alumino silicate having effective pore openings of 4 to 15 angstrom units (A.).

According to one of the embodiments of this invention, the dimerization catalyst can include a crystalline porous cobalt alumino silicate component of the molar formula:

$$CoO \cdot Al_2O_3 \cdot xSiO_2$$

wherein $x$ ranges from 2 to 10 and said component has effective pore openings of 4 to 15 A. units.

Thus, the present invention envisions the use as dimerization catalysts of the "Type A" zeolites, "Type X" zeolites, and "Type Y" zeolites moleculur sieves (both natural and synthetically produced) crystalline alumino silicates having the above molar ratios of silica to alumina and the effective pore openings of 4 to 15 A. units and containing (1) zinc cations predominantly; (2) magnesium cations predominantly; and (3) mixed catalysts containing a mixture of (A) zinc and cobalt cations; (B) magnesium and cobalt cations; and (C) zinc, magnesium and cobalt cations. All of the above exchanged sieves usually contain some residual alkali metal oxides, e.g. $Na_2O$, $K_2O$, etc., present in amounts typically ranging from 0.1 to 5 wt. percent (based on total zeolite catalyst).

Prior to the present invention, several catalytic procedures have been employed to produce dimer aldehydes and ketones from their respective monomers by auto-condensation (referred to broadly herein as "aldolization" which applies both to internal aldehyde condensation and internal ketone condensation), using metallic zinc, metallic magnesium, and the oxides of zinc and magnesium with or without metallic cobalt or cobalt oxides, respectively. While each of the above mentioned catalytic systems operate reasonably well, both the use of the metallic catalysts and the metal oxide catalysts have their respective disadvantages, and it is a primary object of this invention to effect the desired dimerization to obtain the product aldehydes and ketones in increased yield and selectivity and to effect more economically advantageous conversions thereof.

The disadvantages associated with the use of the metallic zinc, metallic magnesium and the metallic cobalt catalysts primarily resides in the fact that these metals are effective only in their ionic forms. For example, in the oxo reaction, use of metal packings such as Zn or Mg (presumably present as $Zn^{++}$ or $Mg^{++}$) catalyzes the formation of dimer aldehydes and dimer alcohols, as in the well-known aldox reaction and modifications thereof.

While the zinc oxide, magnesium oxide and cobalt oxide catalysts overcome some of the difficulties of the corresponding metal zinc, magnesium and cobalt catalysts for aldehyde and ketone dimerizations, e.g., conversion of n-butyraldehyde to 2-ethyl hexaldehydes; n-heptaldehydes to $C_{14}$ aldehydes and similar dimerization reactions; nevertheless, these oxides too possess several drawbacks. For example, the use of a zinc alumina spinel gave, after hydrogenation of the aldol product (feed $C_8$ aldehyde, catalyst zinc-alumina spinel, 6 hours at 350° F.) only a 13.6% yield of dimer ($C_{16}$) alcohol. Low conversion (34%) and poorer selectivity (bottoms yield of 12.8%) were observed. Zinc oxide, per se, also possessed the drawbacks of the zinc-alumina spinel and the magnesia in that it showed low conversion (44.2% with n-butyraldehyde feed after 2 hours at 294–350° F.) with poor selectivity 66% and relatively high bottoms, viz, 14.81% of the total product. Similarly, magnesium oxide, per se, resulted in approximately a 36% yield of $C_{16}$ alcohol after hydrogenation of the aldol product ($C_8$ oxo alcohol treated with activated MgO catalyst 3 hours at 30° F.). Bottoms yield (higher boiling material) was about 14%. Hence, results show low conversion and low selectivity and high bottoms yield.

Some improvement was effected using a combination of zinc oxide and magnesium oxide in that it improved conversion, but selectivity was still poor. For example, using n-butyraldehyde as feed conversion to 2 ethylhexanol after contacting with a mixture of MgO/ZnO for 2 hours at 350° F. was 65.5%. However, 20% of higher boiling material was formed, showing poor selectivity. However, said oxide mixtures still lack the ability to selectively produce dimer products with minimum bottoms (high boiling condensation products) yields.

The abovementioned drawbacks are largely overcome by the practice of the present invention involving the use of the aforementioned zinc-alkali alumino silicate, magnesium-alkali alumino silicate molecular sieve catalysts with or without the cobalt alumino silicate molecular sieve catalyst components. The advantages specifically attributable to the use of the present invention include, but are not limited to, the following:

(1) Improved conversions of aldehyde feed.
(2) Improved selectivity to $C_{2n}$ dimer products with minimum production of high boiling (greater than $C_{2n}$) condensation products.
(3) Flexibility in that it is possible to prepare varying amounts of hydroxyaldehydes which can be hydrogenated to 1,3-glycols.
(4) Economic utilization of the catalytic component on a surface weight basis as outlined previously.
(5) Fixation of the catalytic component in the crystalline matrix so as to prevent catalyst losses in effluent streams.
(6) Utilization of the pore openings to achieve selectivity features. In mixtures of aldehydes, reaction is limited to a major extent only to the aldehyde and ketone molecules imbibed by the zeolite structures employed.

Thus, it will be observed that the present invention constitutes a significant improvement in the catalytic dimerization of $C_n$ monomeric aldehydes and ketones to their corresponding $C_{2n}$ dimerization products.

While it is within the purview of this invention to use natural zinc, magnesium and cobalt alumino silicates, these materials are in very sparse supply naturally. Consequently, synthetic crystalline zinc-exchanged, magnesium-exchanged and cobalt-exchanged metal alumino silicates will usually be employed. The synthetic crystalline zinc-exchanged, magnesium-exchanged, and cobalt-exchanged crystalline alumino silicate dimerization catalysts employed in accordance with this invention usually have silica to alumina mol ratios of 2 to 10 and effective pore openings (diameters) of about 4 to 15 A. units. Also, it is within the purview of this invention to prepare the instant dimerization catalysts by exchanging zinc, magnesium and cobalt in known and conventional manner for alkali metal (chiefly sodium) ions in mordenite and erionite zeolites to prepare Zn, Mg and Co molecular sieves containing Zn, Mg and Co as the predominant metal ions and having the silica-alumina mol ratios and effective pore openings set forth above.

The exchanged molecular sieve catalysts used in this invention can be conveniently prepared from commercially available alkali metal, e.g. $Na_2O$-containing zeolites. Such commercially available zeolites as "Zeolite A," "Zeolite X" and "Zeolite Y" can be employed. The basic differences between these three zeolites are silica to alumina ratios and crystalline structure (as defined e.g. by size of uniform crystal pores). Thus, "Zeolite A" has a typical $SiO_2:Al_2O_3$ mole ratio of 2:1, "Zeolite X" has a typical $SiO_2:Al_2O_3$ mole ratio of 2.7:1; and "Zeolite Y" has a typical $SiO_2:Al_2O_3$ mole ratio of 5:1. "Zeolite X" and "Zeolite Y" have very similar crystalline structures as indicated by uniform pore openings of approximately 7 to 15 angstrom units, e.g. 13 angstrom units. "Zeolite A," however, has characteristic uniform pore openings of 4 angstrom units.

The above molar formula indicates the actual chemical composition of the principal portion of the exchanged prepared, active dimerization catalysts (the remaining 0.1 to 5 wt. percent being residual alkali metal oxide), rather than indicating the initial solutions or dispersions from which the catalysts are initially prepared. Natural and synthetic crystalline zeolites, faujasites, etc. of the type whose use is contemplated herein to dimerize aldehydes and ketones are, per se, known; and the specific chemical nature of these materials is also known and established. The following molar ratio ranges of composition for said dimerization catalysts can be cited as exemplary of those which can be employed with this invention, viz. (0.01–0.99) $MO \cdot Al_2O_3 \cdot (3.0$–$6.0) SiO_2$ in the case of faujasite and $(0.01$–$0.99) MO \cdot Al_2O_3 \cdot (5.0$–$12.0) SiO_2$ in the case of erionite or mordenite. MO in these instances refers to ZnO or MgO or mixtures thereof (with or without CoO), with some residual $Na_2O$ being present. Said exchanged molecular sieve catalysts usually contain from 10 to 25 wt. percent, based on total sieve catalyst, of: magnesium (as oxide), zinc (as oxide) or a mixture of magnesium oxide and zinc oxide. The concentration of cobalt (as oxide) usually ranges from 0.5 to 5 wt. percent, based on total sieve catalyst, when cobalt is present. As noted above, the concentration of residual alkali metal oxide, e.g. $Na_2O$, $K_2O$, etc., usually ranges from 0.1 to 5 wt. percent.

Typical catalyst preparation consists of formation of the alkaline modification of the desired zeolite and cation exchange with one or more of zinc, magnesium and cobalt ions. The formation of the alkaline zeolite involves crystallization from aqueous reaction mixture containing alumina, $Al_2O_3$, as alkaline aluminates, precipitated hydroxides, alumina sol and the like; silica, $SiO_2$, as alkaline silicates, silica hydrogel, siilca sol, etc.; and alkaline metal hydroxides. Sodium hydroxide, expressed as $Na_2O$, is the alkaline hydroxide used in synthesis of zeolites A, X, and Y, whereas mixtures of sodium hydroxide and potassium hydroxide are used in synthesis of other crystalline modifications, e.g., erionite. In such crystallizations careful control is maintained over the alkali metal hydroxide concentration ($Na_2O$, $K_2O$) as well as the proportions of silica to alumina, and the crystallization period to obtain the desired product. A conventional procedure for preparing crystalline alumino-silicate zeolites of the faujasite type follows:

Colloidal silica, such as commercial Ludox (supplied by E. I. du Pont de Nemours and Company, Inc.) is mixed with a solution of sodium hydroxide and sodium aluminate at ambient temperatures to produce a reaction mixture having the following molar ratios of reactants:

| Reactants: | Mol ratio |
|---|---|
| $Na_2O/SiO$ | 0.2–0.8 |
| $SiO_2/Al_2O_3$ | 5–40 |
| $H_2O/Na_2O$ | 20–60 |
| $SiO_2/Al_2O_3$ (of crystalline faujasite product) | 3–6 |

The reaction mixture can then be allowed to digest at ambient temperatures for up to 40 hours or more in order to aid crystallization, after which period it is heated at 180 to 250° F., e.g., 200 to 220° F., for a sufficient time to crystallize the product, e.g., 24 to 200 hours or more. The crystallization period for some zeolites, e.g., Zeolite A, may be as low as 30 minutes. The crystalline sodium alumino silicate is separated from the aqueous mother liquor by decantation or filtration and washed to recover a crystalline product. To assure high structural stability, and thereby maximum catalytic capacity and efficiency during prolonged use, thorough water washing of the zeolite is essential so as to remove any unreacted silicates, aluminates, caustic, or other soluble compounds which may remain in the crystalline product. Slightly acidic wash water can be used to decompose and assist in the removal of objectional residual components.

A typical procedure for preparing synthetic zinc-exchanged faujasite dimerization catalysts suitable for use in accordance with this invention is given hereinbelow:

The washed alkaline modification of faujasite is suspended in a two-fold weight of water and a solution of a soluble zinc salt (nitrate, sulfate, chloride, etc.) consisting of a weight equivalent to the zeolite charge in three-fold weights of water is added at ambient temperature with good agitation. The resultant mixture thus contains the zinc salt in some 16–20 wt. percent concentration. Agitation is continued for periods ranging from 1 to 5 hours, after which the treating liquor is removed by either or a combination of decantation and filtration. The solid portion is suspended again in fresh water and treated with a fresh solution of the zinc salt as in the first instance. Usually some three or four exchanges are thus employed to reduce the alkali metal content to less than 3% as expressed on a dry solids basis. The material thus exchanged some three to four times is water washed to remove the surplus and adhering zinc salt solution. Effective washing is achieved upon suspension in four to five parts by weight of water for periods of 15 minutes to two hours. The wash water is removed by decantation and filtration techniques. A total of three to four such washes usually is sufficient to provide a satisfactory product. Prior to use the catalyst is first dried at temperatures of 200 to 350° F. and then at temperatures of about 850° F. This final heating to the higher temperature frequently is done prior to use. Due to the acidic nature of zinc salts, a critical feature of the zinc ion exchange is the avoidance of temperatures appreciably above the ambient level when solutions containing appreciable amounts of zinc are employed. It is noted that the foregoing procedure discloses ion exchange at ambient temperature and drying only after the zinc salt solutions had been removed by thorough washing.

A typical procedure employed for preparing magnesium exchange synthetic faujasite dimerization catalyst suitable for employment with this invention is given hereinbelow:

The alkaline modification of the faujasite is added to some 5 to 10 parts by weight of a solution containing soluble magnesium salts in some 10 to 30 wt. percent concentration at a temperature of about 150° F. Magnesium chloride is eminently suited to this operation. The faujasite and the magnesium salt solution are maintained in intimate contact by mechanical agitation for periods of about 1 to 5 hours when the treating liquid is removed by decantation and filtration techniques. Additional ion exchanges are made with fresh magnesium salt solution and the treated solids at temperatures of about 150° F. as in the first instances. Usually some 3 to 4 such exchanges are sufficient to reduce the sodium concentration of the faujasite to less than 5%. This low sodium content is desired for catalytic materials. The 3 to 4 fold exchanged faujasite is freed of the treating solution by water washing. Preferably this is accomplished in multiple contacting, each by suspension of the ion exchanged material in about 2 to 4 parts of water and maintenance of agitation for at least 15 minutes, preferably one hour. Some 3 to 4 such washes after sufficient ion exchange usually provide a satisfactory catalyst. The washed material is dried at 200 to 300° F. and then at temperatures up to 850° F. prior to use.

A typical procedure for preparing synthetic cobalt-exchange dimerization catalyst suitable for use in accordance with this invention is given hereinbelow:

The first step involves zinc exchange of zeolite A and the second partial exchange with cobalt salt solution. In these operations a 500 gram charge of zeolite A obtained from the Linde Division of Union Carbide Corporation was suspended in 2000 grams of water and to this suspension a solution of 454 grams of zinc chloride in 500 grams of water was added at ambient temperature and agitation was continued for 21 hours at ambient temperature. The treating liquid was removed by filtration. The wet cake was suspended for one hour in 2000 grams of water and the wash water was removed by filtration. The washed cake was suspended in 2000 grams of water and a second contacting was made with fresh zinc chloride solution as in the first instance, except that a 4 hour treating period was employed. Again a wash by suspension for 1 hour in 2000 grams of water was effected and a third contacting with fresh zinc chloride solution was made for a period of 4 hours at ambient temperature. The three-fold exchanged zeolite A was water washed 5 times each by suspension in 2000 grams of water for one hour, followed by filtration.

The five-fold washed zinc zeolite A was suspended as a wet cake in 1000 grams of water and a solution of 454 grams of cobaltous chloride in 1000 grams of water was added at ambient temperature and agitation was continued for 21 hours. The cobalt-zinc zeolite A so obtained was washed 3 times each by suspension for 1 hour in 2000 grams of water followed by filtration. The washed filter cake was dried at 250 to 300° F. for further use.

When employing a zinc-exchanged-cobalt-exchanged alumino silicate dimerization catalyst or a magnesium-exchanged-cobalt-exchanged alumino silicate catalyst, a simple procedure is to prepare the component materials individually and simply dry mix them for use in the catalyst bed.

Any saturated aliphatic aldehyde containing from 2 to 20 carbon atoms can be dimerized satisfactorily in accordance with the practice of this invention. Usually, however, $C_4$ to $C_{12}$ saturated, aliphatic aldehydes will be employed. Suitable exemplary saturated, aliphatic aldehydes which can be dimerized in accordance with this invention include, but are not limited to, the following: acetaldehyde, propionaldehyde, n-butyraldehyde, isobutyraldehyde, n-valeraldehyde, n-hexaldehyde, isohexaldehyde, n-heptaldehyde, isoheptaldehyde, n-octylaldehyde, iso-octylaldehyde, n-nonyl aldehyde, isononyl aldehyde, n-decyl aldehyde, isodecyl aldehyde, n-undecyl aldehyde, n-dodecyl aldehyde, hexadecyl aldehyde, eicosyl aldehyde, etc.

Any saturated, aliphatic ketone having from 3 to 20 carbon atoms can be dimerized satisfactorily in accordance with the procedure of this invention. Usually, however, the saturated, aliphatic ketone contains from 3 to 12 carbon atoms. Suitable exemplary saturated aliphatic ketones which can be employed include, but are not limited to, the following: dimethyl ketone (acetone), methyl ethyl ketone, diethyl ketone, methyl propylketone, methyl isobutyl ketone, ethyl butyl ketone, propyl butyl ketone, dibutyl ketone, ethyl amyl ketone, propyl amyl ketone, butyl amyl ketone, diamyl ketone, butyl hexyl ketone, amyl hexyl ketone, dihexyl ketone, nonyl decyl ketone, etc.

As mentioned hereinabove, the term "aldolization" is employed herein to designate the dimerization of both ketones and aldehydes. The dimerization reaction in the presence of the abovementioned alumino-silicates can be conducted over a widely varying temperature range satisfactorily, and the specific temperature employed will depend largely upon the specific aldehyde or ketone being dimerized. Usually, however, in dimerization of aldehydes containing from 4 to 12 carbon atoms and ketones containing from 3 to 12 carbon atoms the aldolization temperatures ranges from about 200° F. to 500° F.

The dimerization reaction can be conducted over widely varying pressures ranging from 1 to 300 atmospheres. Usually, however, ambient pressures are employed, viz., atmospheric pressure conditions plus the autogenous pressure due to the reactants. The reaction time can be varied widely within the purview of this invention. Thus, the aldolization (dimerization) reaction can be conducted for time periods ranging from about 5 minutes to about 30 hours or more. Usually, dimerization reaction periods of 10 to 300 minutes suffice to obtain very good selectivities, yields and conversions. Of course, the specific reaction period of time required to attain a desired level of conversion and yield will be influenced primarily by the specific aldehyde and/or ketones being dimerized.

Concerning the feed rates employed, e.g. in continuous dimerizations, the feed rate of $C_n$ aldehyde or ketone can be from about 0.2 to 2.0 v./v./hour (volumes of $C_n$ feed/volume of catalyst/hour). Preferably feed rates of about 0.5 to about 1.0 v./v./hour are employed to aid in reducing bottoms formation.

Of course, any unreacted $C_n$ aldehyde or ketone feed can be removed from the $C_{2n}$ dimer product, e.g. by distillation, and recycled for further conversion to $C_{2n}$ product dimer aldehyde or ketone.

The product dimer aldehydes, hydroxy dimer aldehydes and ketones obtained from the catalytic dimerization procedure can be subjected to subsequent hydrogenation in the presence of conventional hydrogenation catalysts, e.g., Group VI oxides and sulfides on charcoal supports; nickel and/or cobalt on clays, silica gel or diatomaceous earth; the copper nickel and cobalt ion exchange products with various zeolites; and the platinum and palladium zeolites containing from 0.5 to 1.5 wt. percent of the noble metal; nickel hydrogenation catalysts such as Raney nickel, etc., at hydrogenation temperatures of 100 to 600° F. for varying time periods, e.g., 0.5 hour to 5 hours, to give the corresponding dimer alcohols.

These dimer alcohols are mixtures of dimer alcohols (polyhydric) containing significant concentrations of 1,3-glycols; and the present process is readily capable of preparing these 1,3-glycols in superior yields and conversions by conventional hydrogenation of the dimer products. The 1,3-glycols can be employed as insect repellants; plasticizers; additives and surface coatings in combination with epoxy resins; to prepare intermediates for use as synthetic lubricants by condensation of said 1,3-glycols with acid anhydrides; as metal complexing agents; etc.

Hydrogenation can be conducted using conventional hydrogenation catalysts such as those described above. Such hydrogenation reactions can be conducted readily at temperatures of 100 to 600° F. over hydrogenation time periods of 30 to 300 minutes at pressures of 3 to 300 atmospheres of hydrogen.

The present invention will be illustrated in great detail in the examples which follow. Of course, it will be understood that the present invention in its broadest aspects is not necessarily limited to the specific catalysts, reaction conditions and other conditions specified in the below examples; and the present invention is limited only by the claims appended hereto.

EXAMPLE 1

Comparative aldolization runs were conducted in which n-heptaldehyde was dimerized (aldolized) in the presence of zinc and magnesium exchanged 13Y faujasite molecular sieve catalysts, respectively, and also in the presence of a ZnO, MgO, MoO₃ catalyst (molybdena on ZnO/MgO base) containing 30.63 wt. percent ZnO, 15.18 wt. percent MgO and 54.19 wt. percent MoO₃. In each case the catalyst was placed in an extraction thimble and the n-heptaldehyde was refluxed using a Soxhlet extractor and reflux condenser. Run conditions and other pertinent data from these tests are given below in Table 1.

300° F. and 3000 p.s.i.g. pressure. The yields of dimer aldehyde product and other pertinent data from Runs 5–7 are listed hereinbelow in Table 2.

TABLE 2

| Run | 5 | 6 | 7 |
|---|---|---|---|
| Temperature (° F.) | 300 | 350 | 300 |
| Pressure, p.s.i.g | 1,000 | 1,000 | 3,000 |
| Wt. percent C$_{2n}$ dimer products | 46 | 55 | 39 |
| Product distribution (Wt. percent of total product): | | | |
| 2-ethyl hexenal | 37 | 45 } | 39 |
| 2-ethyl hexanal | 9 | 10 } | |
| n-Butyl alcohol | 2 | 2 | 23 |
| Unreacted C$_4$ aldehyde | 52 | 43 | (¹) |

¹ Data not available.

The above data illustrate that the combined Co-Zn exchanged alumino silicate sieve catalyst (Runs 5 and 6) possesses dimerization activity clearly superior to the ZnO-MgO-MoO₃ catalyst (Run 7) despite the fact that this enhanced activity is attained at economically attractive pressures significantly lower than that of Run 7, viz., 1000 p.s.i.g. vs. 3000 p.s.i.g.

What is claimed is:

1. A process for selectively preparing C$_{2n}$ hydroxy dimer aldehydes from C$_n$ aldehydes which comprises contacting a C$_n$ saturated aliphatic aldehyde wherein $n$ is an integer of from 4 to 12 at a temperature in the range of

TABLE 1

| Run No | 1 | 2¹ | 3¹ | 4² |
|---|---|---|---|---|
| C$_n$ feed aldehyde | n-Heptaldehyde | n-Heptaldehyde | n-Heptaldehyde | n-Heptaldehyde |
| Catalyst | ZnO, MgO, MoO₃ | Mg-exchanged 13Y molecular sieve | Mg-exchanged 13Y molecular sieve | Zn-exchanged 13Y molecular sieve |
| Wt. percent catalyst (based on C$_n$ aldehyde) | 15 | 15 | 15 | 15 |
| Reaction temp. range (° F.) | 312–360 | 318–352 | 312–346 | 318–342 |
| Reaction time (hrs.) | 5 | 5 | 5 | 5 |
| Conversion | 52 | 51.6 | 34.8 | 41.5 |
| Selectivity to C$_{2n}$ dimer products (percent of product) ³ | 99 | 98 | 98 | 92 |
| Product distribution (percent) ³ | | | | |
| Unreacted n-heptaldehyde | 48.0 | 48.4 | 65.2 | 58.5 |
| Unsaturated C$_{14}$ aldehyde | 34.7 | 25.7 | 14.8 | 18.8 |
| Hydroxy C$_{14}$ saturated aldehyde | 16.8 | 25.2 | 19.3 | 19.2 |
| Ratio hydroxy C$_{14}$ aldehyde to unsaturated C$_{14}$ aldehyde | 0.5 | 1.0 | 1.3 | 1.0 |

¹ Mg-exchanged 13Y sieve contained 4.8% Na₂O and 6.0% MgO, and had a SiO₂:Al₂O₃ mol ratio of 4.9:1 and effective pore openings of ~13 A.
² Zn-exchanged 13Y sieve contained 13.4% ZnO, 3.1% Na₂O and had a SiO₂:Al₂O₃ mol ratio of 4.9:1 and effective pore openings of 8–13 A.
³ Gas chromatography analyses; percents are area percents.

While no marked difference in conversion to total dimer product occurred between the Mg and Zn exchanged alumino silicate molecular sieve catalytic dimerizations and the ZnO-MgO-MoO₃ catalyst, a marked difference in selectivity to dimer hydroxy aldehyde was noted with both the Zn- and Mg-exchanged alumino silicate catalysts resulting in much higher yields of the C$_{14}$ hydroxy aldehyde. It will also be noted from a comparison of Runs 2 and 3 that by operating at lower conversion the selectivity to C$_{14}$ hydroxy aldehyde was further increased using the Mg-exchanged sieve. Thus by using the Zn and Mg-exchanged catalysts it is possible to increase yields of the dimer 1,3 glycols by hydrogenation.

EXAMPLE 2

A combined cobalt-zinc "Zeolite A" catalyst containing about 17% zinc oxide and about 2% cobalt oxide and having a SiO₂:Al₂O₃ mol ratio of 2:1 with effective pore openings of approximately 5 A. was employed to dimerize n-butyraldehyde to C$_8$ aldehyde product. Two runs (5 and 6) were conducted using this catalyst, one at 300° F. and the other at 350° F. Both Runs 5 and 6 involved passing the n-butyraldehyde over the catalyst at 0.5 v./v./hr. (volumes of aldehyde/volume of catalyst/hour) at 1000 p.s.i.g. pressure and employing hydrogen gas at about 2000 s.c.f./b. (standard cubic feet of hydrogen per barrel of aldehyde). Run 7 gives this performance using ZnO.MgO.MoO₃ catalyst to dimerize n-butyraldehyde at from about 200 to about 500° F., wherein said C$_n$ feed is continuously passed into contact at a rate of from about 0.2 to 2.0 volumes of feed per volume of catalyst per hour with an inorganic, crystalline, porous catalyst containing a porous metal aluminosilicate molecular sieve catalyst composed principally of materials of the molar formula: MO·Al₂O₃·xSiO₂ wherein M is a metal selected from the group consisting of zinc and magnesium and $x$ ranges from 2 to 10, said porous metal aluminosilicates having effective pore openings of 4 to 15 A.

2. A process as in claim 1 wherein said catalyst includes a crystalline, porous cobalt aluminosilicate molecular sieve catalyst component of the molar formula:

$$CoO \cdot Al_2O_3 \cdot xSiO_2$$

wherein $x$ ranges from 2 to 10 and having effective pore openings of 4 to 15 angstroms and wherein said catalyst includes from 0.1 to 5 wt. percent alkali metal oxide, based on total sieve catalyst.

3. A process as in claim 2 wherein said catalyst contains 10 to 25 wt. percent zinc (as ZnO) based on total sieve catalyst.

4. A process as in claim 2 wherein said catalyst contains 10 to 25 wt. percent of a mixture of magnesium (as MgO) and zinc (as ZnO) based on total sieve catalyst.

5. A process as in claim 2 wherein said catalyst contains from 0.5 to 5 wt. percent cobalt (as CoO), based on total sieve catalyst.

6. A process as in claim 1 wherein said catalyst includes from 0.1 to 5 wt. percent alkali metal oxide, based on total sieve catalyst.

7. A process as in claim 6 wherein said alkali metal is sodium.

8. A process as in claim 1 wherein said feed rate ranges from about 0.5 to 1.0 volumes of feed/volume of catalyst/hour.

9. A process as in claim 1 wherein said zeolite catalyst is obtained from synthetic faujasite.

10. A process as in claim 1 wherein said zeolite catalyst is obtained from "Zeolite A."

11. A process as in claim 10 wherein said zeolite catalyst contains from 0.1 to 5 wt. percent residual sodium as $Na_2O$, based on total sieve catalyst.

12. A process as in claim 6 wherein said catalyst contains 10 to 25 wt. percent magnesium (as MgO), based on total sieve catalyst.

13. A process as in claim 6 wherein said catalyst contains 10 to 25 wt. percent zinc (as ZnO), based on total sieve catalyst.

14. A process as in claim 6 wherein said catalyst contains 10 to 25 wt. percent of a mixture of magnesium (as MgO) and zinc (as ZnO), based on total sieve catalyst.

References Cited

UNITED STATES PATENTS

| | | | |
|---|---|---|---|
| 3,352,924 | 11/1967 | Gladrow et al | 260—604 |
| 3,275,571 | 9/1966 | Mattox | 252—455 |
| 3,236,762 | 2/1966 | Rabo et al. | 208—111 |
| 3,119,876 | 1/1964 | Jaros et al | 260—604 |
| 3,013,984 | 12/1961 | Breck | 252—455 |

FOREIGN PATENTS

| | | | |
|---|---|---|---|
| 1,010,695 | 11/1965 | Great Britain | 260—593 |

LEON ZITVER, Primary Examiner

R. H. LILES, Assistant Examiner

U.S. Cl. X.R.

260—635 A, 593 R; 252—455 Z